United States Patent [19]

Kurtze et al.

[11] 3,985,198

[45] Oct. 12, 1976

[54] SOUND DEADENING LAMINATE

[75] Inventors: Gunther Kurtze, Weinheim-Lutzelsachsen; Klaus Heckel, Weinheim, both of Germany

[73] Assignee: Firma Carl Freudenberg, Weinheim, Germany

[22] Filed: Feb. 7, 1975

[21] Appl. No.: 548,133

[30] Foreign Application Priority Data

Feb. 20, 1974  Germany............................ 2408028

[52] U.S. Cl............................................. 181/33 G
[51] Int. Cl.² ............................................. E04B 1/99
[58] Field of Search ...................... 181/33 G, 33 GA

[56] References Cited
UNITED STATES PATENTS

| | | | |
|---|---|---|---|
| 1,926,509 | 9/1933 | Biertuempfel .................... | 181/33 G |
| 1,929,425 | 10/1933 | Hermann ........................... | 181/33 G |
| 2,132,642 | 10/1938 | Parsons............................. | 181/33 G |
| 2,330,941 | 10/1943 | Acuff................................. | 181/33 G |
| 2,744,042 | 5/1956 | Pace ................................. | 181/33 G |
| 3,211,253 | 10/1965 | Gonzalez .......................... | 181/33 G |
| 3,831,710 | 8/1974 | Wirt.................................. | 181/33 G |

FOREIGN PATENTS OR APPLICATIONS

| | | | |
|---|---|---|---|
| 803,115 | 1/1969 | Canada............................. | 181/33 G |

Primary Examiner—Lawrence R. Franklin
Attorney, Agent, or Firm—Burgess, Dinklage & Sprung

[57] ABSTRACT

A sound deadening system is provided, comprising a laminate of a covering stratum of closed-cell soft foam having a bulk density of less than about 50 kp/m³, and a core stratum having cavities and joined to the covering stratum at locations spaced from one another by a distance less than about 10 times the thickness of the covering stratum, the total area of the joinders between the covering stratum and the core stratum being less than about ⅔ of the covering stratum area. The core stratum may have a honeycomb structure, such as expanded sheet metal, a closed-cell soft foam possibly in granular form, etc. The laminate may include additionally an additional covering stratum on the other side of the core stratum or even multiple layers of alternating covering and core strata. A paper sheet may be provided on the last core stratum for cementing to a surface. Reinforcements can be provided embedded in or on the back of the core stratum, e.g. a metal sheet. Expanded metal sheet can simultaneously function as core and reinforcement, permitting the laminate to be rolled in one direction for ease of transport.

10 Claims, 5 Drawing Figures

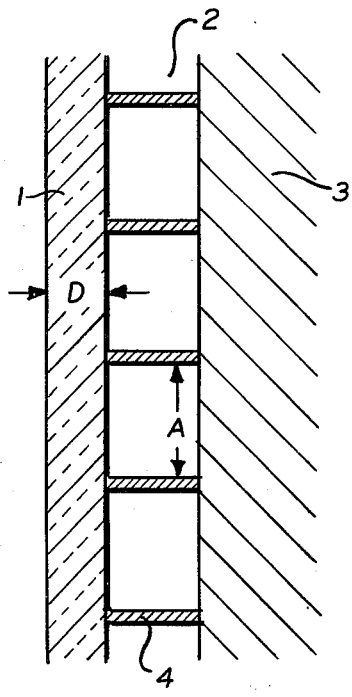
FIG. I
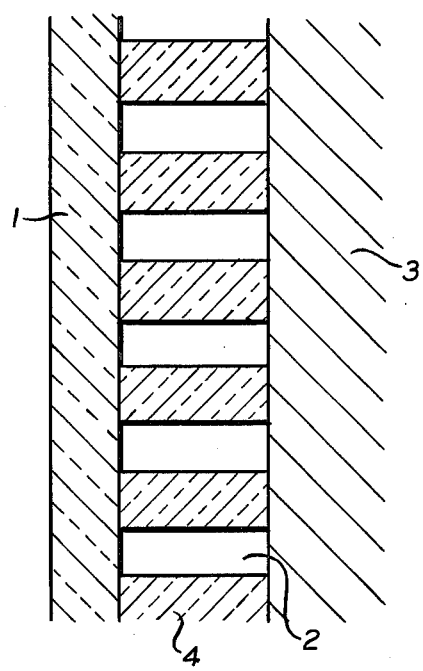
FIG. II
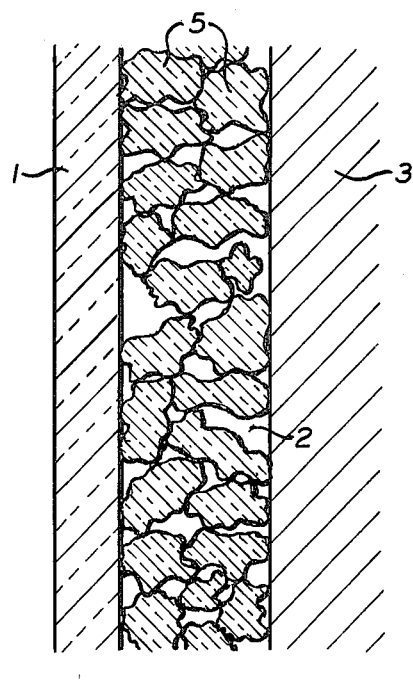
FIG. III
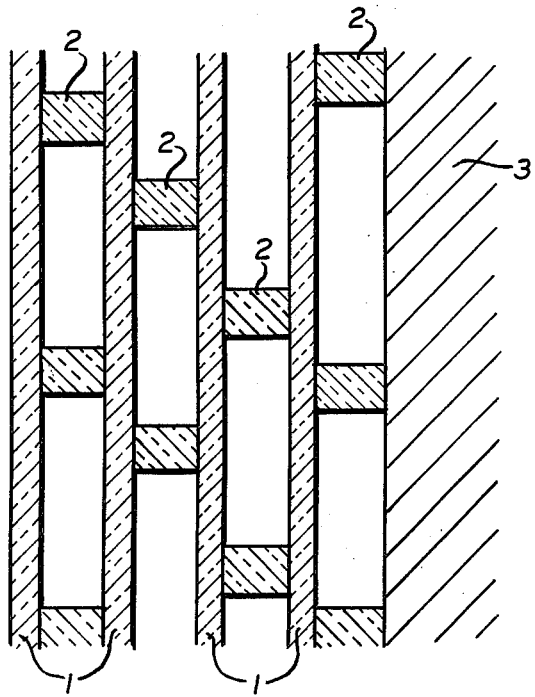
FIG. IV
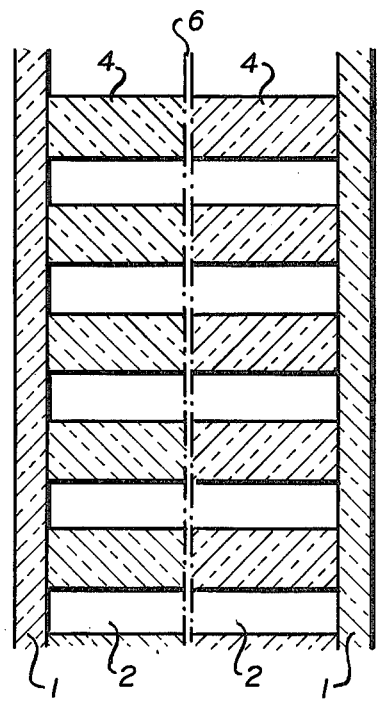
FIG. V

SOUND DEADENING LAMINATE

BACKGROUND

The invention relates to a sound deadening system made of foam material.

Sound absorbing materials are, in the present state of the art, open-cell fiber or foam substances whose structure inhibits the alternating movements of the air which are produced by sound and which thus transform sound energy to heat by viscous friction. Upon entering into an open-pored substance of this kind the sound does not pass from one medium into another but remains in the air. Therefore, if the porosity is sufficiently great— and in most sound deadening substances it is greater than 95%—it can easily penetrate into the substance.

The requirement that sound deadening substances have open pores, which is based on this mechanism, results in a variety of disadvantages in regard to their application. Sound deadening boards are easily soiled, are not washable, absorb water, oil or other liquids and then become ineffective, they cannot be painted over, etc. Since sound deadening boards are also thermal insulation boards, water of condensation often forms within the boards and then drips (ceilings over swimming pools). Attempts are made to avoid these disadvantages by covering the visible side of the boards with thin sheets of plastic. This, however, impairs the penetration of the sound into the sound deadening substance. The covering reflects part of the sound, and the higher the frequency is, and the heavier the covering is, and the more tightly it is applied to the sound deadening substance, the more the sound is reflected. The mechanical strength requirement of the plastic coverings also results in unsatisfactory compromises. This system has advantages only for the absorption of lower frequencies, which can be somewhat higher than it is in sound deadening substances which are not covered with plastic due to resonance effects.

Fundamentally, there is a second possibility for the absorption of sound, namely the conversion of energy by the deformation of solid bodies caused by the sound. This knowledge is not new, and has long been used for the absorption of sound transmitted through liquids and solid bodies. In the case of sound transmitted through air this has not been possible hitherto because the high input impedances of solid bodies render the penetration of airborne sound virtually impossible. The input impedance $Z$ of a medium for sound waves is given by the product of the density $\delta$ and the velocity of sound $c$:

$$Z = \delta \cdot c \qquad (1)$$

Since even the lightest solids, such as plastic foams for example, have a density that is higher than that of air by a factor of at least 10, the input impedance of the solid, $Z_F$, will therefore be greater by at least a factor of 10, than the wave impedance $Z_L$ of air. The result is a reflection factor $r$ at the surface, which in any case is greater than $$r = \frac{Z_F - Z_L}{Z_F + Z_L} > \frac{10 - 1}{10 + 1} = 0.82 \qquad (2)$$

In the case of all closed-cell hard foams, such as polystyrene foam for example, the stiffness of the structure is furthermore so high that the velocity of sound $c_F$ in the solid is substantially greater than the velocity of sound $c_L$ in the air, so that the ratio $$\frac{Z_F}{Z_L} = \frac{\delta_F \cdot c_F}{\delta_L \cdot c_L} \qquad (3)$$

is even more unfavorable. Furthermore, in the known hard foams the internal losses are so low that no appreciable sound absorption can be achieved by deformation.

Closed-cell soft foams, especially cross-linked polyethylene foam, offer a better basis from the outset. The internal losses are high, especially in shear deformation, and the structural stiffness is low. The minimum density $\delta_F$ that is achievable at the present time is still about 20 times greater than that of air, but on the other hand the sound velocity $c_F$ is approximately comparable with that of air.

If a foam of this kind, in which $Z_F = 20\ Z_L$, is used as a sound absorber, very little success will be achieved. Mathematically, we have the following for a vertical impingement of sound:

$$r = \frac{19}{21} = 0.9 \qquad (4)$$

$$\alpha = 1 - /r/^2 = 0.19 \qquad (5)$$

that is, a sound absorption degree $\alpha$ of only 19%, which in the case of an oblique impingement of sound is slightly greater but still insufficient. It is for this reason that closed-cell foams are not used for sound absorption purposes.

THE INVENTION

It has now been found that, suprisingly, closed-cell soft foams can be used for sound absorption if the sound deadening system is structured in a certain manner. Accordingly, a sound deadening system of foam material is proposed which is characterized by at least one covering stratum of closed-cell soft foam having a bulk weight less than 50 kp/m³, a core stratum placed behind the covering stratum, and a stiffening element if desired, the core stratum having cavities and being joined spot-wise and/or by webs to the covering stratum such that the junction areas amount to less than two-thirds of the covering stratum area and the distance between adjacent junction points or lines is less than ten times the covering stratum thickness. In a sound deadening system of this type the special structuration diminishes the reflection factor (4) of the homogeneous foam, i.e., matching to the ambient air is improved, and it is improved such that shear deformations are preferentially produced, resulting in high internal losses.

FIGS. I – V are cross-sectional representations of particularly advantageous embodiments of the sound deadening system of the invention.

FIG. I shows the soft foam covering stratum 1, which is supported, not over its entire surface, but only spot-wise or line-wise by a core stratum 2 having spacers 4. The stiff spacers 4 disposed between the closed-cell soft foam stratum 1 and the wall 3 may have, for example, a honeycomb structure. The sound pressure of an impinging sound wave in this arrangement causes, in addition to the compression of the foam stratum, a positive bending between the points or lines of support.

The input impedance of the foam stratum is thereby diminished. As long as the thickness D of the covering stratum 1 is not small in comparison to the spacing A of the supports, that is, as long as D and A are of the same order of magnitude, this bending is associated with considerable shear deformations, so that the desired internal losses are produced. At the same time the covering stratum 1 together with the air cavity behind it in the core stratum forms a resonator whose natural frequency will depend on the mass and flexural stiffness of the foam stratum 1 and on the depth of the core stratum 2. The resonator effect can be desired whenever low-frequency sound is to be absorbed in a controlled manner. Usually, however, a broad-band action is desired, which in the case of the soft foam, such as polyethylene foam, for example, is produced in a largely positive manner on account of the high internal attenuation. It may be advantageous to achieve a more uniform absorption over a broad frequency range by systematically or randomly varying the spacing A between adjacent supports. This distributes the resonant frequencies over a broad frequency range.

FIG. II shows another advantageous embodiment of the sound deadening system. To reduce the input impendance of the board and thus to reduce the reflection factor $r$, soft spacers 4, also made of soft foam, are provided instead of the stiff spacers. Between the covering stratum 1 and the wall 3 there is accordingly a core stratum 2 composed of soft foam posts or webs 4, such as for example a soft foam honeycomb produced by slitting and stretching in the manner of expanded sheet metal mesh. Webs or posts are generally better than a homogeneous foam stratum because in them the sound is propagated in the form of dilational waves which have a lower velocity of propagation than the compression waves in the homogeneous medium. The sound velocity $c_F$ in Equation 3 thus becomes lower, and the matching becomes better.

In accordance with the above, it may be desirable to depart from the regular structure of the core stratum 2 and to produce a random distribution of the points of support of the covering stratum 1. FIG. III shows an arrangement constructed in this manner, which contains as the core stratum a loosely bound layer of foam granules 5. Foam wastes can be used as the foam granules for this purpose.

The two-layer sound deadening system is laminated to a sheet material on its back, according to a desirable embodiment of the invention, in order to facilitate handling and to prevent the penetration of moisture into the cavities. A paper backing has proven especially desirable, because the sound deadening system can then be installed with conventional dispersion cements. In the case of polyethylene which, in addition to other known soft foams having bulk weights of less than 50 kp/m³, such as polybutylenes or copolymers containing polyethylene and polybutylene, rubber-like soft foams, or the like, is especially suitable as a closed-cell foam in the meaning of the present invention, lamination with any desired materials is very simple to accomplish by flame duplexing, while in other cases cementing may be better. In the case of polyethylene, for example, it is well known that cementing presents difficulties.

Particularly great effectiveness is obtained by sandwiching sound-deadening systems of the described kind together, as shown in FIG. IV, such that the covering stratum 1 and the spacer 2 are alternated with one another. It has been determined by measurements that the speed of propagation of sound in such a system can be reduced to one-fifth of the speed of sound in air, so that the described arrangement, in comparison to a conventional, open-pore absorber, requires only one-fifth of the thickness of the latter for the same effectiveness.

The sound deadening system of the invention can advantageously be made acoustically absorptive on both sides, this being necessary, for example, when it is used as a sound deadening baffle. In this case the arrangement is symmetrically disposed as shown in FIG. V. The core stratum 2 is again provided two boards 1 of soft foam. Spacers 4 are located in the core stratum. In the central plane a sheet of metal or a grid can be inserted as a reinforcing element 6.

The sound deadening system can vary extensively as regards material and as regards the structure while retaining the features of the invention, and can be adapted to particular requirements. For example, the preferred size for boards whose acoustical effect is to begin at about 300 Hz as the lower limit frequency, will be a covering stratum thickness of 5 mm and a core stratum thickness of 25 mm.

For sound absorbing baffles under the same conditions, the thickness will be double, that is twice 5 mm for the covering strata and about 50 mm for the core thickness.

The bilaterally sound absorptive board of symmetrical construction can also be used as a portable sound absorbing partition or as a noise baffle. In this case the sound attenuation can be improved if the stiffening or reinforcing core in the center, which is necessary in any case, is made reasonably heavy.

By backing the sound deadening system with a heavy sheet material or with a piece of sheet metal, the noise blocking can be improved to such an extent that it can be used as a material for muffling enclosures on machines or the like. In muffling enclosures of this kind, a noise blocking action of about 20 dB is required, which can be achieved with a soft material, such as a rubber board having a specific weight of more than about 2 kp/m², e.g. 3 kp/m². An indispensable requirement is furthermore a sound deadening lining on the inside, and for this purpose the closed-cell sound deadening system is very well suited, because it is completely insensitive to oil spray, for example.

For the construction of muffling enclosures it is desirable to have the wall material available in tranversely stiffened rolls, so as to permit unsupported laying over relatively great widths, while still enabling the material to be rolled up lengthwise. An example of the construction of a sound absorbing and noise muffling wall material of this kind is a soft foam covering stratum approximately 5 mm thick joined to a soft foam core stratum approximately 20 mm thick and composed of granules.

Expanded sheet metal can furthermore be provided, and a rubber sheet 1.5 mm thick filled with heavy spar to increase its weight. The expanded metal in this case provides the reinforcement which is stiff in one direction and pliable in the other direction. The structure of the expanded sheet metal also makes it possible, where requirements are not severe, to eliminate the core stratum, because it fulfills the structural requirements which the core stratum is intended to meet. In this manner the structure is simplified and the sound deadening system in this case consists of a soft foam covering stratum only about 20 mm thick, expanded metal having a mesh width greater than 10 mm, and a rubber sheet.

As noted, the core may comprise foam granules whose diameter is of the same order of magnitude as the thickness of the covering stratum, i.e. the diameter ranges from about 0.1 to 10 and preferably about 0.3 to 3 times the covering stratum thickness.

A few representative laminates are identified in the following examples:

LAMINATE 1

Covering stratum-closed-cell soft polyethylene foam, 5 mm thick, bulk weight of 25 kp/m$^3$
Core stratum-closed-cell foamed polyethylene, 25 mm thick, bulk weight of 25 kp/m$^3$
Joinder-circular spot welds 3 mm in diameter in hexagonal pattern with 10 mm center-to-center
Backing-paper sheet

LAMINATE 2

Covering stratum-closed-cell soft polyethylene foam, 5 mm thick, bulk weight of 35 kp/m$^3$
Core stratum-sheet of foamed polyethylene granules 20 mm thick, average granule diameter 5 mm, sheet bulk weight 25 kp/m$^3$
Joinder-tackiness of polyethylene granules, estimate 10% area contact and joinder
Backing-steel sheet 2 mm thick.

It will be appreciated that the instant specification and examples are set forth by way of illustration and not limitation, and that various modifications and changes may be made without departing from the spirit and scope of the present invention.

What is claimed is:

1. A sound deadening laminate comprising a covering stratum of closed-cell soft foam having a bulk density of less than about 50 kp/m$^3$, and a core stratum comprising closed-cell soft foam granules having a diameter of the same order of magnitude as the thickness of the covering stratum and joined to the covering stratum at locations spaced from one another by a distance less than about 10 times the thickness of the covering stratum, the total area of the joinders between the covering stratum and the core stratum being less than about ⅔ of the covering stratum area.

2. A sound deadening laminate according to claim 1, including a reinforcing element for said core stratum spaced from said covering stratum.

3. A sound deadening laminate according to claim 2, wherein the core element comprises an expanded metal sheet serving simultaneously as a reinforcement and permitting curving of the laminate in one direction while resisting curving in another direction.

4. A sound deadening laminate according to claim 2, wherein said reinforcing element comprises a metal plate on the back of said core stratum, said plate contributing to the sound deadening.

5. A sound deadening laminate according to claim 1, including a plurality of alternating covering strata and core strata.

6. A sound deadening laminate according to claim 1, including a second covering stratum of closed-cell soft foam, the core stratum being sandwiched between said two covering strata.

7. A sound deadening laminate according to claim 6, including a stiff plate within said core stratum serving as a reinforcing element.

8. A sound deadening laminate according to claim 1, including a sheet on the core stratum face remote from said covering stratum.

9. A sound deadening laminate according to claim 8, wherein said sheet comprises paper.

10. A sound deadening laminate according to claim 8, wherein said sheet has a specific weight of more than about 2 kp/m$^2$, thereby contributing to the sound deadening.

* * * * *